June 13, 1944.  A. HANSEN, JR  2,351,424

MAGNETIC SUSPENSION FOR HORIZONTAL SHAFTS

Filed Dec. 29, 1941  2 Sheets-Sheet 1

Inventor:
Albert Hansen, Jr.,
by Harry E. Dunham
His Attorney.

June 13, 1944.  A. HANSEN, JR  2,351,424
MAGNETIC SUSPENSION FOR HORIZONTAL SHAFTS
Filed Dec. 29, 1941  2 Sheets-Sheet 2
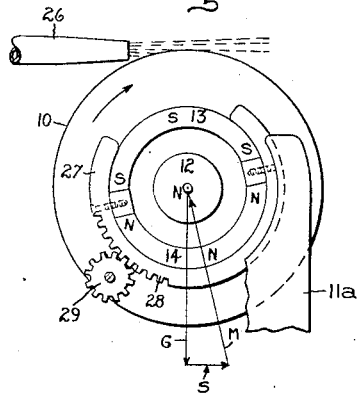
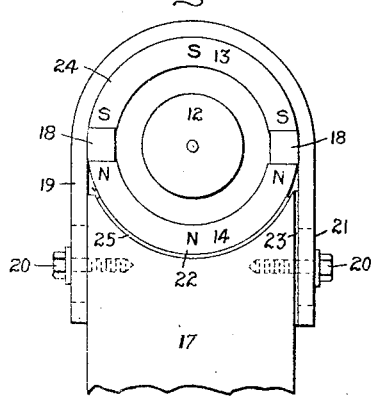
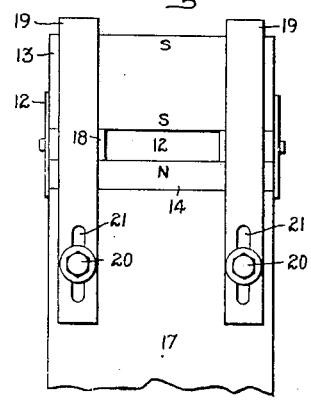
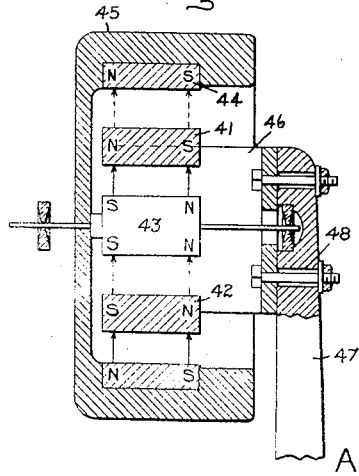
Inventor:
Albert Hansen, Jr.,
by Harry E. Dunham
His Attorney.

Patented June 13, 1944

2,351,424

UNITED STATES PATENT OFFICE 2,351,424

MAGNETIC SUSPENSION FOR HORIZONTAL SHAFTS

Albert Hansen, Jr., Nahant, Mass., assignor to General Electric Company, a corporation of New York Application December 29, 1941, Serial No. 424,781

13 Claims. (Cl. 308—1)

My invention relates to the magnetic suspension of horizontal or substantially horizontal shafts, including partial or total magnetic suspension. The invention is particularly useful for rotatively supporting high speed horizontal shafts, such for example as the shafts of gyroscopes for the purpose of avoiding or reducing bearing trouble, lubrication problems, friction, vibration noise and greatly increasing bearing life. It may also be used to facilitate the balancing of rotating apparatus and to provide an adjustable amount of frictionless end thrust.

Figure 1:
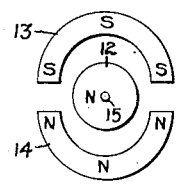
Figure 2:
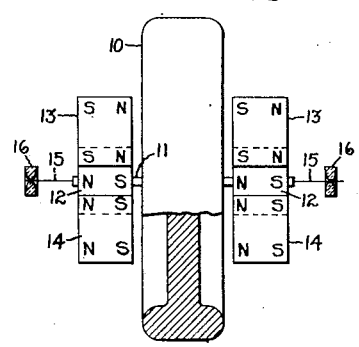
Figure 3:
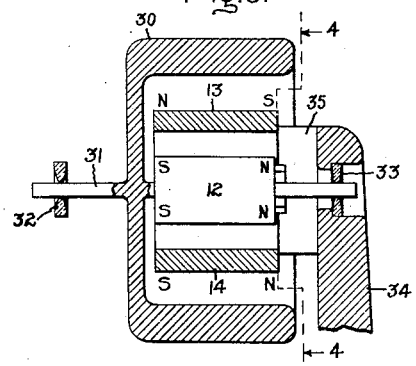
Figure 4:
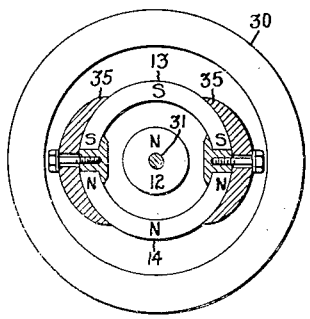
Figure 5:
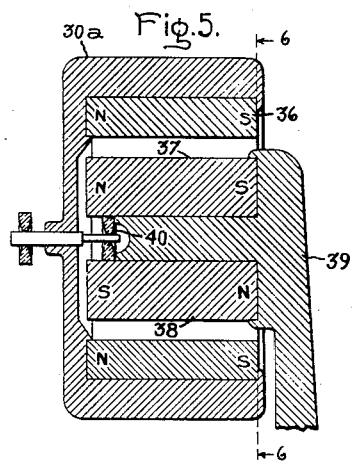
Figure 6:
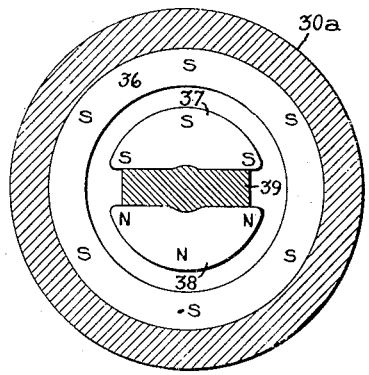

The features of my invention which are believed to be novel and patentable will be pointed out in the claims appended hereto. For a better understanding of my invention reference is made in the following description to the accompanying drawings, in which Figs. 1 and 2 show end and side views of a double magnetic suspension for a gyroscope flywheel rotating on a horizontal axis. Figs. 3 and 4 show sectional side and end views of rotating apparatus with internal magnetic suspension. Figs. 5 and 6 show sectional side and end views of an arrangement much like that of Figs. 3 and 4 except that in Figs. 5 and 6 the stationary magnet of the unitary magnetic suspension is placed on the inside instead of on the outside of the rotating magnet. Fig. 7 illustrates an arrangement for adjusting a magnetic suspension to compensate for side thrust that may be due to a driving force for example, Figs. 8 and 9 show end and side views of an adjustable support for the stationary magnets of a magnet suspension of the form shown in Figs. 1 and 2, and Fig. 10 illustrates a horizontal magnetic suspension with inner and outer magnets cooperating with a magnet between them.

Referring now to Figs. 1 and 2, 10 represents apparatus mounted on a horizontal shaft 11 in order that it may be rotated. 10 may represent the flywheel of a gyroscope, for example. The horizontal shaft 11 has in place of the usual bearings a pair of similar magnetic suspension units, one at either end of the shaft. Each of these suspensions comprises a cylindrical permanent magnet 12 coaxial with and mounted or otherwise secured to shaft 11, and a pair of sector-shaped permanent magnets 13 and 14 which are stationary and are vertically spaced from each other and from the cylindrical permanent magnet 12 with their concave sides facing the magnet 12. Stationary magnet 13 is above and magnet 14 below magnet 12. The polar and geometric axes of all of the magnets are parallel with the horizontal axis of rotation of shaft 11. The three magnets of a suspension unit are the same or substantially the same length and are positioned with their ends even or substantially even with each other. The upper stationary magnets 13 are polarized to attract their corresponding rotary magnets 12 while the lower stationary magnets 14 are polarized to repel the adjacent rotary magnets 12. Magnets 13, being above, thus produce lifting forces on the rotating shaft assembly and magnets 14, being below, also produce a lifting force on the rotating shaft assembly. The sum of these lifting forces may be and preferably is made equal to the force of gravity on the rotating shaft assembly and at the proper positions to magnetically support the weight of the rotating apparatus evenly and without end thrust.

In the arrangement shown, when the flywheel is evenly centered between the magnetic suspensions, each will support half the weight. In any case, however, where one suspension would be required to support more than half the weight in order to maintain the shaft horizontal, the magnets of such suspension would be more strongly polarized or made correspondingly larger than the magnets of the other suspension. The shaft 11 has flexible extensions 15 guided in small stationary bearings 16 and to take up any residual weight or other side thrust that is not supported by the magnetic suspensions. In the initial set-up the stationary magnets will be adjusted in position or magnetic strength or both until there is no bending of these flexible shaft extensions. They serve the additional purpose of an indicator of the proper or improper adjustment of the magnetic suspensions, both for the initial adjustment and for later adjustments that may become desirable due, for example, to a slight weakening of the strength of the permanent magnets or to modified application of the driving force, as will be explained in connection with Fig. 7. The lifting force of the magnetic suspension may be increased and decreased by moving the stationary magnets nearer or farther from the rotating permanent magnet. However, if such adjustments are carried too far, the permanent magnets will not be utilized at best efficiency. The relative size and positioning of the permanent magnets, as shown in the various drawings, represent good efficiency in the utilization of permanent magnets made of an alloy of 50% copper, 21% nickel and 29% cobalt, more fully described in United States Patent 2,170,047. Such material has a coercive force of about 800. Other permanent magnet materials may call for a slightly different proportioning and arrangement of the magnets for best utilization thereof. Using magnets of an axial length of approximately one-half inch and otherwise proportioned and positioned substantially as shown in Figs. 1 and 2, I have completely magnetically supported horizontal rotating assemblies weighing one-half pound, including the weight of permanent magnets 12, each of which weighed .05 pound and with stationary magnets 13 and 14, each weighing 0.1 pound.

The magnetic suspension permits the use of horizontally rotating apparatus up to speeds limited only by the limit of strength of the apparatus (such as a flywheel breaking by centrifugal force) and without bearing friction or lubrication problems and without vibration and bearing noises.

In the forms of magnetic suspension described I find it an advantage to make the upper attracting permanent magnets 13 exert a greater influence than the lower repelling permanent magnet 14. This can be done either by making magnets 13 stronger or by adjusting them to be closer to magnets 12 for the following reasons. Since the magnets 14 are polarized to repel magnets 13, such forces, if not evenly balanced in a vertical direction, would tend to repel the shaft 11 endwise from a centered position. On the other hand, the force of attraction produced between the upper magnets 13 and rotary magnets 12 will oppose any axial displacement from a centered position. Hence, by making the forces produced by the upper attracting magnets 13 slightly greater than those produced by the lower repelling magnets 14, the axial centering forces of attraction will always predominate over repelling forces tending to move the shaft axially from the centered position. Hence the shaft assembly remains magnetically centered axially as illustrated where both forces of attraction and repulsion are a maximum in a lifting direction. It follows that the shaft assembly may be adjusted endwise by moving the permanent magnets endwise and that a magnetic end thrust of a variable amount may thus be provided should it be desirable.

Figs. 8 and 9 show one possible way of supporting the stationary magnets so that they may be adjusted in various ways. Here I have represented a pedestal 17 which may be of an axial length corresponding to the axial length of the magnets. It is provided with an upper cradle surface for supporting the lower magnet 14. The upper magnet 13 is supported on the lower magnet 14 with non-magnetic spacers 18 intervening. A pair of straps 19 are then provided at each end of the suspension which straps may be bolted to the pedestal 17 by bolts 20. The bolts pass through elongated slots 21 in the straps so that different size spacers or shims may be inserted at 18. Shims of different thickness and shape may be inserted between the magnet 14 and pedestal 17 as shown at 22. When the straps are loosened, the circular assembly comprising magnets 13, 14 and spacers 18 may be rotatively adjusted as a whole. Also, the magnets 13 and 14 may be adjusted endwise. Limited sidewise adjustment of the magnets may be had by the use of shims at 23, 24 and 25. When the magnets are properly adjusted the straps 19 are pressed down and securely bolted in place. It will be understood that the materials used closely adjacent the magnets should be of non-magnetic materials or precautions taken otherwise to prevent diverting useful flux from the magnets. The reason why it may be desirable to adjust the magnets so that the lift on the rotor assembly is not exactly vertical is explained in connection with Fig. 7.

Suppose we drive the flywheel 10 with a blast of air directed against and generally tangent to its periphery, as by an air nozzle 26, as shown in Fig. 7. This will produce a side thrust on the rotary assembly which we may represent by the vector arrow S. Arrow G represents the vector force of gravity. Then, to balance the forces S and G it is necessary that the magnetic suspension forces correspond to the vector resultant M, which is not vertical. The magnetic force vector M may be positioned as shown by rotating the stationary magnets counter-clockwise from the position previously designated and as indicated in Fig. 7. The pedestal 11a may take the form of a cradle in which the stationary magnets and their supporting ring structure 27 are rotatively mounted. The ring structure 27 may have a rack gear 28 cut therein with which a spur gear 29 meshes to facilitate rotary adjustment of the stationary magnets of the suspension. Changes in speed and driving force will generally call for a change in such rotary adjustment.

In Figs. 3 and 4 I have shown another form of my invention where the weight of a cup-shaped rotor 30 is partially or wholly supported by a single magnet suspension comprising a cylindrical permanent magnet 12 secured on the axis of rotation to the rotor 30 and stationary magnets 13 and 14 of the type previously described. The rotary parts are mounted on a shaft 31 guided by bearings 32 and 33. The center of gravity of the rotary assembly should preferably lie in a vertical line corresponding with the resultant vertical lift of the magnetic suspension and adjustments for this condition may be made by movement of the flywheel 30 or the magnet 12 along the shaft. 34 represents a pedestal support for the stationary magnets. Such pedestal may contain the guide bearing 33. As represented in the drawings the pedestal 34 has laterally spaced arms 35 extending into the rotor cup and to which the stationary magnets 13 and 14 are clamped.

The outer permanent magnets may be made part of the flywheel and rotate as will be evident from 30a, Fig. 5, which shows another variation in that the outer rotary permanent magnet 36 is made of a continuous hollow cylinder with upper and lower halves polarized the same. Two stationary inner permanent magnets 37 and 38 are provided, reversely polarized. The upper magnet 37 is polarized to oppose magnet 36 while the lower magnet 38 is polarized to attract magnet 36, both stationary magnets thus producing lifting forces on the rotary outer magnet 36. Here the repulsion force is above and the attraction force below the axis of rotation. In this case the lower magnet 38 will preferably exert a greater influence than magnet 37 as a precaution against endwise displacement. A pedestal 39 supports the inner stationary permanent magnets and a guide bearing 40.

In Fig. 10 I have shown a magnetic suspension with two stationary permanent magnets 41 and 42 cooperating with an inner rotary magnet 43 and an outer rotary magnet 44, the rotary magnets adding their weight to the flywheel 45. Here we have attraction between magnets 41 and 43 and between magnets 42 and 44 and repulsion between magnets 44 and 41 and between 43 and 42, all forces lifting on the rotary assembly. Attraction forces are designated by full line arrows and repulsion forces by dotted line arrows. Here an increase in strength of magnet 41 as compared to magnet 42 to prevent axial displacement is ineffective because it also increases the repulsion forces between magnets 41 and 44 and weakens the attractive forces between magnets 42 and 44. I may, however, accomplish the desired result by slightly lowering the stationary magnets 41 and 42 from a concentric position, thereby increasing both attraction forces and weakening both repulsion forces. The clamping structure 46 for the stationary magnets is made separate from pedestal 47 but bolted thereto by bolts which pass through enlarged slots 48 in the pedestal so that I may adjust the position of the stationary magnets vertically sideways and in a rotative direction by desired amounts. This makes a very stable and powerful magnetic suspension for horizontal shaft rotary apparatus. When rotating, the flywheel may be likened to a top spinning in space on a horizontal axis, but with the force of gravity nullified. In the various modifications of the invention described, the axis of rotation has been represented as horizontal. I wish to point out that it is not essential that the rotary axis be exactly horizontal and when the expression horizontal axis and the like is used herein it will include axes sufficiently close to the horizontal as to utilize the invention described.

The drawings may not and are not intended to represent the most practicable bearings to be used in all cases. In any case and particularly where the horizontal bearing load is likely to vary, conventional sleeve or ball bearings may be used. The advantages of the suspension are great even though only a fraction of the weight of the rotating part be supported magnetically. A generally accepted formula for bearing life follows:

$$\text{Bearing life} = \frac{K}{\text{Speed} \times (\text{load})^3}$$

where K is a constant depending upon the exact type of bearing used. This illustrates the great gain in bearing life obtainable by magnetically carrying the weight ordinarily carried by the bearings or even a part thereof. For example, other things being equal if half the weight were carried by magnetic suspension, the probable life of a given bearing would be extended eight times. Magnetic suspension as used herein does not necessarily imply complete magnetic suspension.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A magnetic suspension for horizontal shafts including with the shaft to be supported a cylindrical permanent magnet coaxial with said shaft and polarized in the direction of its axis and stationary permanent magnets above and below the cylindrical magnet positioned and polarized so that the magnet above the shaft attracts and the magnet below the shaft repels the cylindrical magnet.

2. In a magnetic suspension for horizontal shafts, a rotary cylindrical permanent magnet having its mechanical and polarized axes coinciding with its axis of rotation and a stationary permanent magnet spaced above the cylindrical permanent magnet, said stationary magnet having a length substantially the same as the cylindrical magnet, of a sector-shaped cross section with its concave side facing the rotary magnet and polarized on an axis parallel with the axis of rotation but in a direction reverse to that of the rotary magnet.

3. In a magnetic suspension for horizontal shafts, a cylindrical permanent magnet mounted for rotation on a horizontal axis coinciding with its mechanical and polarized axes, a stationary permanent magnet spaced from and below the rotary magnet, said stationary magnet being polarized and positioned so that the rotary and stationary magnets have their magnetic poles of like polarity adjacent each other whereby lifting forces of repulsion are produced on the rotary magnet, and means for preventing axial displacement of the rotary magnet.

4. A magnetic suspension for horizontal shafts comprising permanent magnet means mounted for rotation on a horizontal axis and stationary permanent magnet means mounted adjacent thereto for producing upwardly lifting magnetic forces of attraction and repulsion on the rotatively mounted permanent magnet means.

5. A magnetic suspension comprising permanent magnet means mounted for rotation on a horizontal axis, and stationary permanent magnet means mounted adjacent thereto for producing upwardly lifting magnetic forces of attraction and repulsion on the rotatively mounted permanent magnet means, said forces being so proportioned as to resist axial displacement of the rotatively mounted permanent magnet means.

6. A magnetic suspension including a cylindrical permanent magnet mounted for rotation on a horizontal axis, the mechanical and polarized axes of said magnet coinciding with the axis of rotation, a stationary permanent magnet polarized and positioned to produce an upwardly lifting force of attraction on said rotary magnet in all rotary positions thereof and a second stationary permanent magnet polarized and positioned to produce an upwardly lifting force of repulsion on said rotary magnet in all rotary positions thereof.

7. A magnetic suspension comprising a permanent magnet of cylindrical shape mounted for rotation on its axis and with the axis of rotation horizontal, a stationary permanent magnet adjacent to and magnetically cooperating with the upper portion of the rotary permanent magnet, a second stationary permanent magnet adjacent to and magnetically cooperating with the lower portion of the rotary permanent magnet, said magnets being polarized to cause one stationary magnet to produce an upwardly lifting force of attraction on the rotary permanent magnet and to cause the other stationary magnet to produce an upwardly lifting force of repulsion on said rotary permanent magnet, both of said forces being effective in all rotary positions of the rotary magnet.

8. A magnetic suspension for horizontal shafts comprising permanent magnet means mounted for rotation on a horizontal axis, a pair of stationary permanent magnet means located adjacent to the rotary magnet means, said permanent magnet means being polarized to cause an upwardly lifting force of magnetic attraction on the rotary permanent magnet means by one, and an upwardly lifting force of magnetic repulsion on the rotary permanent magnet means by the other, of said stationary permanent magnet means, and means for supporting the stationary permanent magnet means whereby they may be adjusted with respect to the rotary permanent magnet means.

9. A magnetic suspension comprising a permanent magnet mounted for rotation on a horizontal axis, a pair of stationary permanent magnets one being located adjacent to the upper portion of the rotary magnet and the other being located adjacent to the lower portion of the rotary permanent magnet, said magnets being polarized to cause upwardly lifting forces of attraction and repulsion on the rotary permanent magnet in all rotary positions thereof, and supporting structure for said stationary permanent magnets with respect to which they may be adjusted around the axis of rotation of the rotary permanent magnet to correspondingly adjust the direction of the resultant upwardly lifting force with respect to the vertical.

10. A magnetic suspension for horizontal shafts comprising in combination with a shaft mounted for rotation on a horizontal axis, inner and outer cylindrical permanent magnets mounted on said shaft with their axes concentric to the axis of rotation and reversely polarized parallel to said axis, a pair of stationary permanent magnets, one being positioned between the upper portions of the rotary permanent magnets and the other being positioned between the lower portions of the rotary permanent magnets, said stationary magnets being reversely polarized parallel to the axis of rotation, the upper stationary magnet producing upwardly lifting forces of repulsion and attraction, respectively, on the outer and inner rotary magnets, and the lower stationary permanent magnet producing upwardly lifting attracting and repulsion forces respectively on the outer and inner rotary magnets.

11. A magnetic suspension comprising a hollow cylindrical permanent magnet polarized in the direction of its axis and mounted for rotation on its axis and with such axis horizontal, and a pair of stationary sector-shaped permanent magnets mounted within said hollow magnet, one spaced adjacent the lower portion of the cylindrical magnet, said stationary magnets being spaced apart and reversely polarized parallel to the axis of rotation with the upper one polarized in the same direction as the cylindrical magnet, all of said magnets being of substantially the same axial length.

12. A magnetic suspension comprising a cylindrical permanent magnet polarized in the direction of its axis and mounted for rotation on and with its axis in a horizontal direction, and a pair of stationary sector-shaped permanent magnets, one mounted above and the other mounted below the rotary magnet with their concave surface spaced from and facing the rotary magnet, all of said magnets being of substantially the same length and mounted substantially in vertical alignment, the upper sector-shaped magnet being polarized in the opposite direction and the lower sector-shaped magnet being polarized in the same direction as the rotary magnet.

13. In a magnetic suspension magnetic means mounted for rotation on a horizontal axis, and stationary magnetic means mounted adjacent thereto, said rotary and stationary magnetic means being magnetized so as to produce upwardly lifting magnetic forces of attraction and repulsion on the rotatively mounted magnetic means, said forces being so proportioned as to resist axial displacement of the rotatively mounted magnetic means by the magnetic repulsion forces.

ALBERT HANSEN, Jr.